United States Patent [19]

Gudmundsen

[11] 3,855,583

[45] Dec. 17, 1974

[54] CONDUCTOR-INSULATOR-JUNCTION (CIJ) OPTICAL MEMORY DEVICE AND A MEMORY SYSTEM DEPENDENT THEREON

[75] Inventor: Richard A. Gudmundsen, Santa Ana, Calif.

[73] Assignee: Rockwell International Corporation, El Segundo, Calif.

[22] Filed: June 4, 1973

[21] Appl. No.: 366,829

[52] U.S. Cl..... 340/173 LS, 340/173 LM, 307/304, 307/311

[51] Int. Cl......................... G11c 11/40, G11c 11/42

[58] Field of Search... 340/173 R, 173 LS, 173 LM; 307/304, 311

[56] References Cited

UNITED STATES PATENTS

| | | | |
|---|---|---|---|
| 3,737,877 | 6/1973 | Feinleib | 340/173 LS |
| 3,739,353 | 6/1973 | Bjorklund | 340/173 LS |
| 3,746,867 | 7/1973 | Phela | 340/173 LS |

*Primary Examiner*—Terrell W. Fears

*Attorney, Agent, or Firm*—H. Frederick Hamann; G. Donald Weber, Jr.; Robert Ochis

[57] ABSTRACT

An optically activated (write and read) semiconductor memory employing a conductor-insulator-junction (CIJ) structure is disclosed. The layered memory structure comprises a front transparent conductive layer; insulator means containing a storage interface capable of trapping charges thereat, said insulator means being susceptible to tunneling between the storage interface and a back surface of the insulator means; semiconductor means having a front surface and a rectifying junction, said semiconductor means having an inversion stop grid means associated with the front surface thereof, and contact means for connecting external voltages to both sides of the rectifying junction for biasing the junction. The insulator means preferably comprises a relatively thick silicon nitride layer and a relatively thin silicon oxide layer, where the storage interface is the interface between the nitride and the oxide. The semiconductor means preferably comprises successive n-type and p-type regions with a pn junction therebetween. The inversion stop grid is preferably a grid of more heavily doped semiconductor of the same conductivity type as the front surface of the semiconductor. The grid divides the memory device into individual memory cells. The contact means preferably comprises an ohmic contact to the edge of the front semiconductor region and a back electrode making ohmic contact with the other semiconductor region. To write information into the memory device, a write voltage on the order of eighty volts is established between the transparent conductor and the front semiconductor region. This establishes individual inversion regions along the front surface of the semiconductor, the individual regions being isolated by the high conductivity grid. A light beam for which h¾>$E_{gap}$ of the semiconductor is focused on the individual regions in which a charge (binary one) is to be stored. The light beam generates holeelectron pairs within the front semiconductor region. Because of the inversion region, the carriers which would be minority carriers in the first semiconductor region drift to the semiconductorinsulator interface. These charges cause a tunneling electric field to be established between the storage interface and the insulator back surface. This field induces a tunneling current which neutralizes part of the collected charge and establishes trapped storage charges at the storage interface. No significant tunneling occurs where the writing beam does not impinge. Information is read out by back biasing the pn-junction and establishing a voltage on the order of 3 volts between the transparent conductor and the front semiconductor region. The resulting electric field establishes individual inversion regions in the front semiconductor region behind those storage sites (memory cells) which do not have any significant charge stored at the storage interface. No inversion regions are established under the storage sites which store significant charge. A reading light beam having h¾>$E_{gap}$ is scanned across the structure to read the stored data. The minority carriers generated by the light beam drift in opposite directions in accordance with the existence or nonexistence of an inversion region. Where there is an inversion region, the minority carriers diffuse to the semiconductor-insulator interface and there is a minimum pn-junction current and a minimum output current from the back electrode. Where there is no inversion region the minority carriers drift to the pn-junction and produce a maximum pn-junction current and a maximum output current from the back electrode. This system provides long term storage of data and nondestructive readout. Data is erased by applying an erase voltage of opposite polarity to the write voltage across the insulation means. The opposite polarity of the voltage causes electrons to collect at the semiconductor insulator interface and tunnel to the storage interface so that the charge stored at the storage interface is neutralized, thus erasing the stored data. This process produces block erasing. If it is desired to preserve some of the data within a memory block which is to be erased, then that data must be read out, stored, and rewritten after the memory block has been erased. In the memory system employing the CIJ device the writing beam is digitally controlled to write desired data into the memory structure. Light emitting diodes (LED's) are the preferred light source, with $Ga_{1-x}Al_xAs$ the preferred diode material because of its high energy output. The memory structure is preferably mounted on a rotatable disc so that a limited number of light sources can be used for writing into and reading out of a much greater number of storage cells. A 20 inch diameter disc, having memory units over 350° can store $9.24 \times 10^{10}$ bits of data using the CIJ memory device.

21 Claims, 14 Drawing Figures

CONDUCTOR-INSULATOR-JUNCTION (CIJ) OPTICAL MEMORY DEVICE AND A MEMORY SYSTEM DEPENDENT THEREON

RELATED APPLICATIONS

This patent application is related to three other applications each of which was filed on the same day as this application. Two of these applications are entitled "A Permanent Storage Charge Transferred-Tunneled-and-Trapped ($CT^3$) Memory;" Ser. Nos. 366,830 and 366,831. Ser. No. 366,830 is a joint invention of Dr's. Richard A. Gudmundsen and Barry T. French. Ser. No. 366,381 is a sole invention of Dr. Gudmundsen. The third related application now is U.S. Pat. No. 3,833,762 entitled "A Solid State Integrating Image Motion, Compensating, Scan Converter;" Ser. No. 366,828, a sole invention of Dr. Gudmundsen. Each of the above applications is assigned to the same assignee as this invention and each of the above applications is expressly incorporated hereby reference.

BACKGROUND OF THE INVENTION

Field of the Invention

The invention relates to the field of solid state memories and more particularly to the field of optically addressed, long term storage solid state memories.

Prior Art

Memory systems are known in which a light beam is used to generate hole-electron pairs, the minority carriers of which concentrate in an inversion region. These memories are of the temporary storage variety, and sense the light generated by the recombination of the carriers in order to detect the stored value.

Memories are also known in which electron beams are used to charge the gate insulator of field effect transistors to selectively store binary ones and zeros therein. The charge stored in the gates modulate the conductivity of the underlying channel and are sensed by attempting to pass a current through the channel.

The above systems have the disadvantages that they are either short term storage systems or require individual wiring to the storage device to detect the information stored therein and further require the appplication of the voltage parallel to the surface of the structure. The resulting wiring wastes much space which could be used to store information and thereby provides a memory which is not area efficient.

OBJECTS

A primary object of the present invention is to overcome the disadvantges of the prior art memories.

Another object is to provide a long term storage memory in which no wiring to individual storage sites is needed.

Another object is to provide a long term storage, optically addressed semiconductor memory.

Still another object is to provide a charge storage memory whose stored charge is detected because of its effect on carrier flow perpendicular to the semiconductor's major surface.

SUMMARY

The invention employs a conductor-insulator-junction structure in which stored information is sensed by its effect on carrier flow away from or toward the device's front (major) surface.

The layered memory structure comprises a transparent front conductive layer means; insulation means containing a charge storage interface, the insulation means being susceptible to tunneling between the storage interface and a back surface of the insulation means; semiconductor means having a rectifying junction and having an inversion stop grid means associated with its front surface to prevent the formation of inversion regions which extend across the grid lines; and contact means for making external voltage connections to both sides of the rectifying junction.

This device makes possible an optical memory system in which more than $10^{10}$ bits of data may be stored on a single 20 inch diameter disc.

DESCRIPTION OF THE PREFERRED EMBODIMENTS

I. APPARATUS

Figure 1:
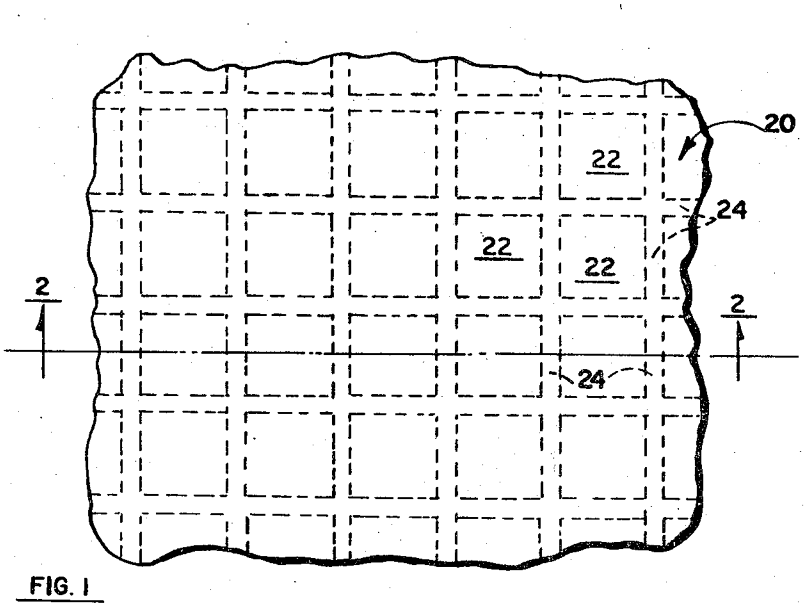
FIG. 1 is a plan view of a portion of a CIJ memory device in accordance with the invention.
Figure 2:
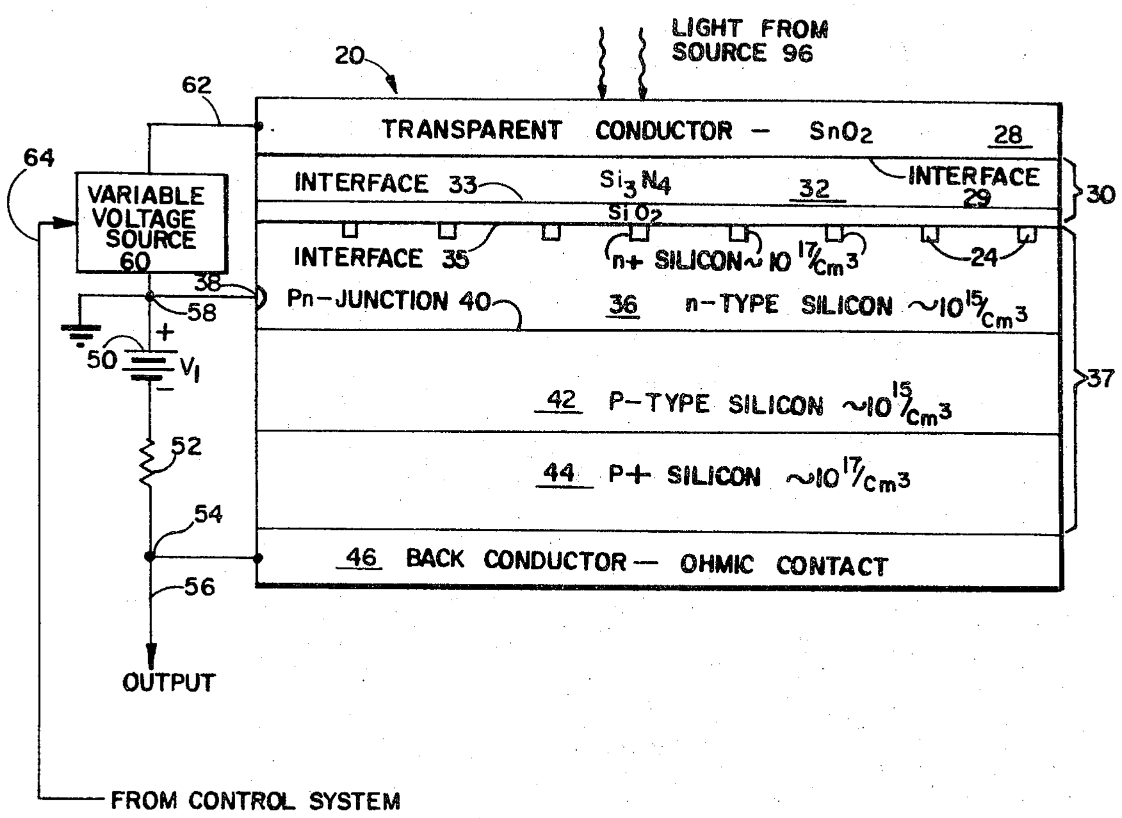
FIG. 2 is a cross section of the memory device of FIG. 1 taken along the line 2—2, looking in the direction of the arrows. Voltage supplies are schematically added to clarify the description.

The preferred semiconductor memory structure is shown generally at 20 in FIG. 1 in plan view and in FIG. 2 in cross section. The plan surface of device 20 is divided into a plurality of individual storage sites or memory cells 22 by a grid 24. The front surface of memory device 20 faces a writing and reading light source (not shown in this Figure). The front surface is comprised of a transparent conductor or electrode 28 which is preferably tin oxide ($SnO_2$) and on the order of 10,000 A thick in order to provide the needed conductivity. Behind the transparent conductor 28 is an insulator means 30 preferably comprising front and back insulating layers 32 and 34, having a common interface 33. Layer 32 is preferably silicon nitride ($Si_3N_4$) and between 500 and 1,000 A thick. Layer 34 is preferably silicon oxide ($SiO_2$) and about 20 A thick. Interface 33 constitutes a storage interface at which charges may be trapped as will be explained in more detail hereinafter. The insulator means must be susceptible to tunneling between storage interface 33 and the back surface of the insulation means (i.e., the back of layer 34). Behind insulator means 30 is a semiconductor means 37 having a front surface and a rectifying junction. The portion of the semiconductor in front of the rectifying junction is designated 36 and may be referred to as the front region of the semiconductor. Front region 36 of the semiconductor is of a first type, preferably n-type silicon having a donor density on the order of $10^{15}$ atoms per $cm^3$. The front surface of semiconductor 37 (or region 36) forms an interface 35 with the back surface of insulation means 30 and has an inversion stop grid means 24 associated with its front surface. The inversion stop means 24 is preferably a semiconductor grid of the same conductivity type as the front region 36 of semiconductor means 37 but more heavily doped (on the order of $10^{17}$ donor atoms per $cm^3$) to prevent the formation of inversion regions which extend across the grid lines. The grid lines are preferably formed by ion implantation to provide high resolution. A grid line width of 1000 A and a grid spacing of 10,000 A are preferred. This yields an active memory cell 10,000 A on a side. The invention stopping means effectively isolates the individual memory cells 22. The grid 24 is preferably inlaid into the surface of region 36 and has its front surface flush with interface 35. Memory device 20 further comprises contact means for connecting external voltages to both sides of the rectifying junction (40). As shown, it is preferred to have the rectifying junction 40 within the semiconductor region 37 separating the front semiconductor region 36 from a back semiconductor region 42 of a second conductivity type, preferably p-type silicon having an acceptor density of the order of $10^{15}$ atoms per $cm^3$. Each region 36 and 42 is preferably 50,000 A thick. The back semiconductor region preferably has a back ohmic contact 46 which constitutes a portion of the contact means. As shown it is considered preferable to have a region 44 of the same conductivity type as region 42, but more heavily doped (on the order of $10^{17}$ acceptor atoms per $cm^3$) than region 42 intervene between region 42 and contact 46. It will be understood that if region 44 is of sufficient conductivity it can serve as the back contact means. A contact 38 to region 36 is provided as the other part of the contact means.

Several auxiliary elements which provide the voltages needed for proper operation of the memory device as shown in FIG. 2, even though they are not physically a part of the CIJ memory device. These elements include a fixed d.c. voltage source 50 with a load resistor 52 connected in series with its negative terminal. The positive terminal of the voltage source is connected to a ground node 58. Contact means 38 on the n-type region 36 is also connected to this ground node. The second end of resistor 52 is connected to an output node 54. Back contact means 46 is also connected to node 54 as is an output lead 56. A controllable voltage source 60 controlled by a memory control means 70 is connected between transparent conductor 28 and ground node 58. The fixed voltage supply 50 maintains pn-junction 40 back biased at all times. The variable voltage source 60 establishes writing, reading and erase voltages across the insulating means, in accordance with command signals from control means 70.

As an alternative to placement of the rectifying junction within the semiconductor region 37, the rectifying junction can be formed by a metallic conductor and the front semiconductor region 36.

Figure 3:
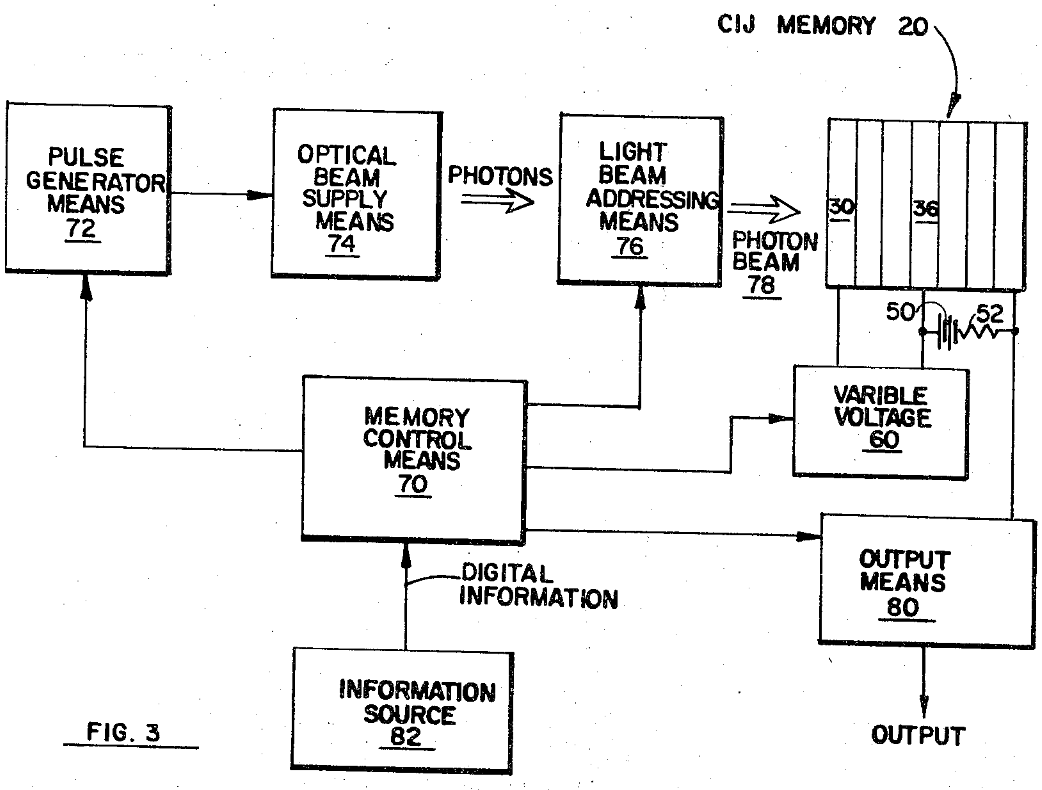
FIG. 3 is a block diagram of the preferred memory system employing the CIJ optical memory device.

An overall memory system employing the CIJ optical memory is shown in block diagram form in FIG. 3. The system comprises a memory control means 70 for providing the necessary control signals and timing the memory operation. Information to be stored in the memory is received by control means 70 from information source 82. The control means processes the information to produce control signals for a pulse generator means 72 which pulses an optical beam supply means 74 which provides an intensity modulated light beam whose modulation is the information to be stored. The control means also controls a light beam addressing means which determines where the data beam strikes the CIJ optical memory device 20. As mentioned above, control means 70 also control voltage source 60 to determine that mode the CIJ device is operating in.

An output means 80, such as gated amplifier may also be controlled by control means 70 to prevent the production of output signals which are meaningless during writing and erasing of the CIJ device.

Figure 4:
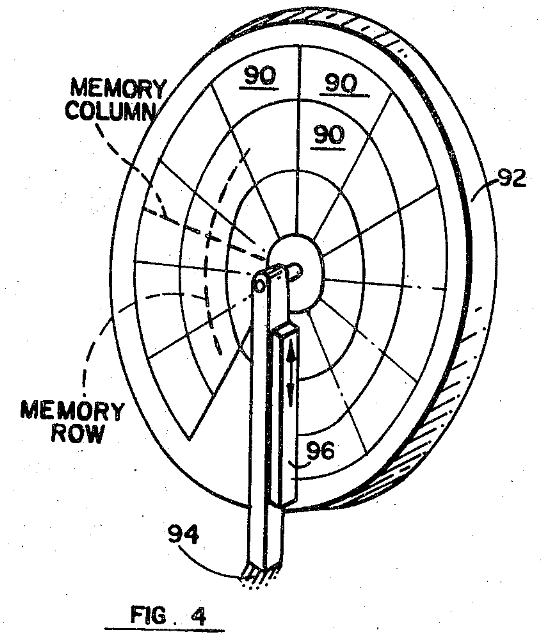
FIG. 4 is a perspective view of the preferred memory device support means and addressing means.

A preferred CIJ device support means and addressing means are illustrated in FIG. 4. A plurality of semiconductor wafers 90 each comprising a plurality of CIJ memory devices are mounted on both sides of a rotatable disc 92. Disc 92 is suspended by support means 94 which preferably includes drive means for rotating the disc on a shaft through its center. Rotation of disc 92 is preferably limited to 360° or less to facilitate the connection of supply voltages and output leads. A light source means 96 is mounted on the support means 94 for illuminating memory cells in an input-output position.

Light source means 96 is made translatable radially with respect to disc 92 to align its light beam with a selected "row" of memory sites. Disc 92 is rotated to being a selected "column" of memory sites into alignment with light source 96.

Figure 5:
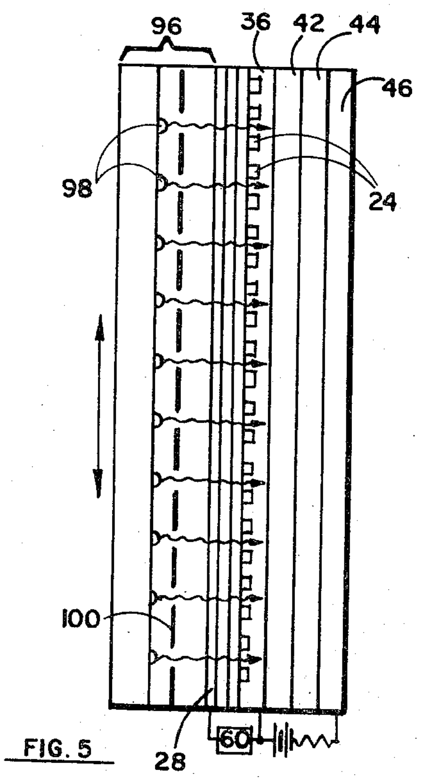
FIG. 5 is a detail of FIG. 4 showing the relative positions of the memory devices and the activating light source when a memory cell is being addressed.

As shown in FIG. 5 light source 96 preferably comprises a plurality of light emitting diodes (LED's) 98 which provide an appropriate wavelength of light, i.e., one for which $h\nu > E_{gap}$. $Ga_{1-x}Al_xAs$ diodes are preferred over GaAs diodes because of the greater output energy they make available. Each LED is individually selected by the light beam addressing means in order to address the proper memory cell 22. The LED's preferably have an overlying mask 100 to restrict the light beam to prevent light flow from the diode from striking non-selected memory sites.

The light source means 96 is placed as close to the CIJ memory devices as possible (while avoiding contact) in order to maximize the amount of light from the LED which strikes the selected memory site. Contact between the light source and the CIJ devices must be avoided, since such contact would soon destroy the memory devices by gouging their surface.

II. OPERATION OF THE INVENTION

Operation of the memory involves three distinct operations on the CIJ optical memory device; writing, reading and erasing. These operations are discussed hereinafter and their discussion is followed by a discussion of the operation of the overall memory system.

A. Writing into the CIJ Optical Memory

To write information into the CIJ memory here specifically embodied as a conductor-nitride-oxide-junction (CNOJ) memory, the pn-junction 40 is back biased by voltage source 50 and a voltage $V_2$ on the order of 50 and 80 volts is applied to the transparent conductor 28 by source 60 to drive transparent conductor 28 negative relative to the n-type silicon region 36. This voltage induces an inversion region within region 36 in each individual memory cell 22. The high conductivity grid 24 prevents the establishment of an inversion region there, thus isolating each memory cell.

Figure 6:
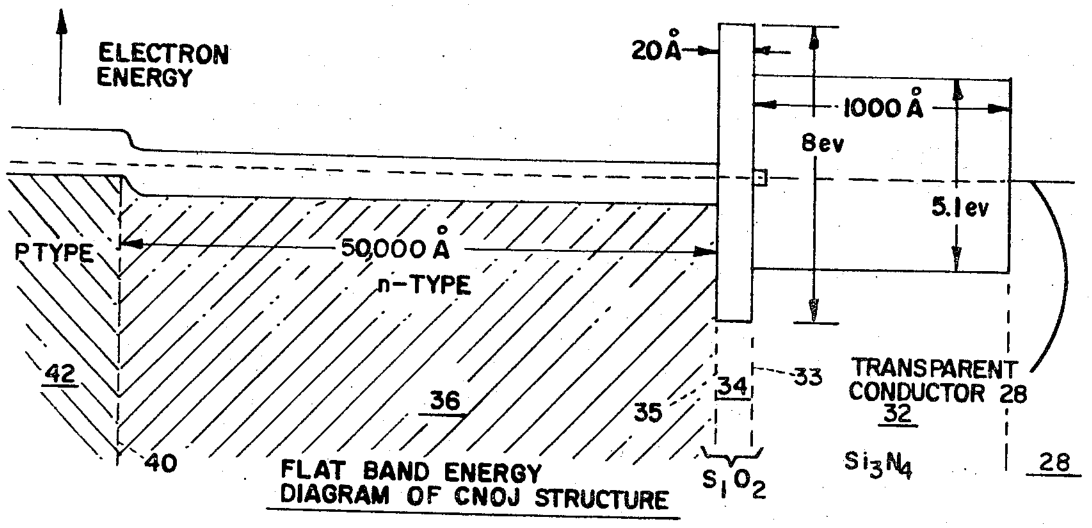
FIG. 6 is a flat band energy diagram for the CNOJ structure in which the invention is embodied.

A flat-band energy diagram for the memory structure at a memory cell is shown in FIG. 6 and will be helpful in understanding the subsequent figures illustrating the steps involved in writing into the memory. The location in this diagram of each of the significant features of the structure is identified by the same numerals as in FIG. 2.

Figure 7C:
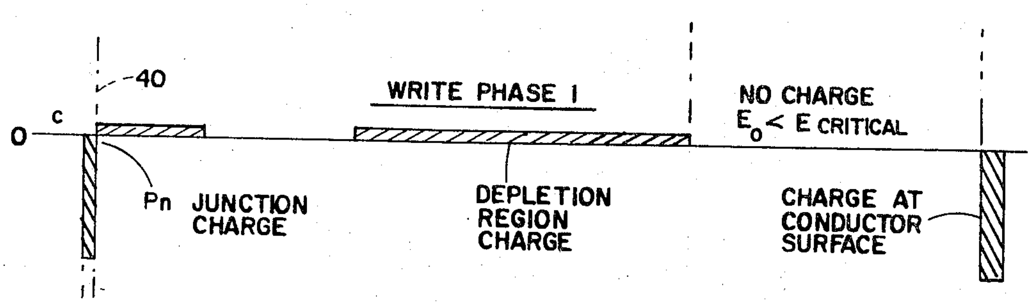
FIG. 7 illustrates the electric potential, electric field and charge distribution in the device after the write voltage has been applied, but before the light source has been activated.
Figure 7B:
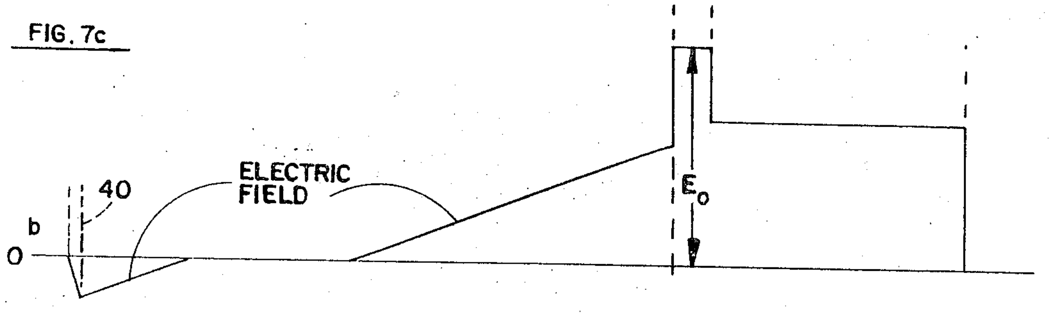
Figure 7A:
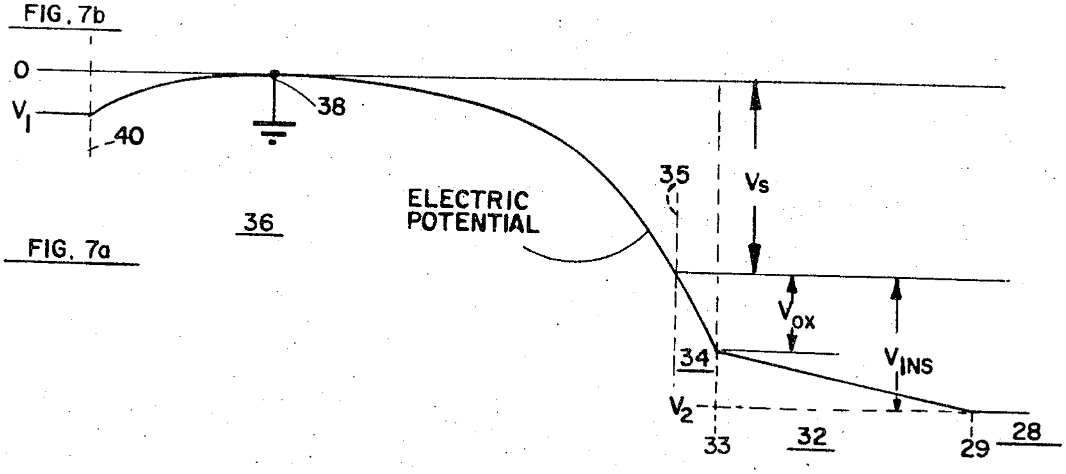

FIG. 7 illustrates the potential (a), the electric field (b) and the charge (c) in the memory structure prior to activation of the light source. The voltage across the silicon of region 36 is denoted $V_s$, while the voltage across the oxide is denoted $V_{ox}$ and the total voltage across the insulators is denoted $V_{ins}$. P-type region 42 is held at a potential of $-V_1$ by source 50, the junction charge at junction 40 raises the potential to ground which is the potential impressed on region 36 by the ground connection to contact 38. The potential decreases as interface 35 is approached because of the establishment of a depletion region. This results in a linearly increasing electric field strength. In the back insulator layer 34 the potential decreases linearly since no charge is present in this region. Because of the lesser dielectric permittivity of the silicon oxide the value of the electric field across the oxide is significantly greater than that at the front edge of region 36. In the front insulator layer 32, the potential continues to decrease linearly, but at a slower rate because of silicon nitride's greater dielectric permittivity. The field strength across the nitride is correspondingly lower than across the oxide. The electric field terminates on the charge at the conductor surface.

Figure 8:
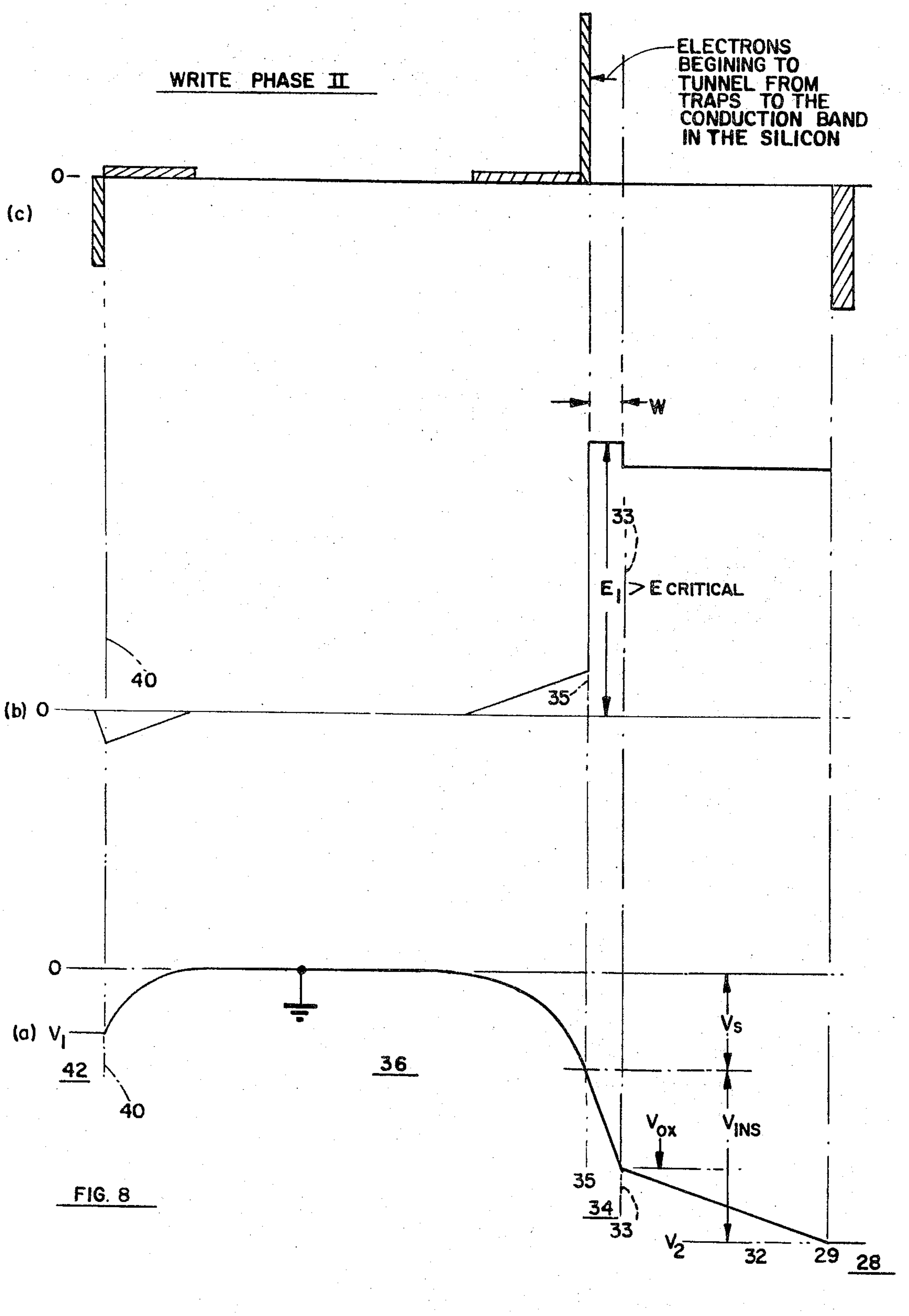
FIG. 8 illustrates the potential, field, and charge distribution after the light beam has generated a plurality of photo holes and electrons at the point where tunneling current is beginning to flow.
Figure 9:
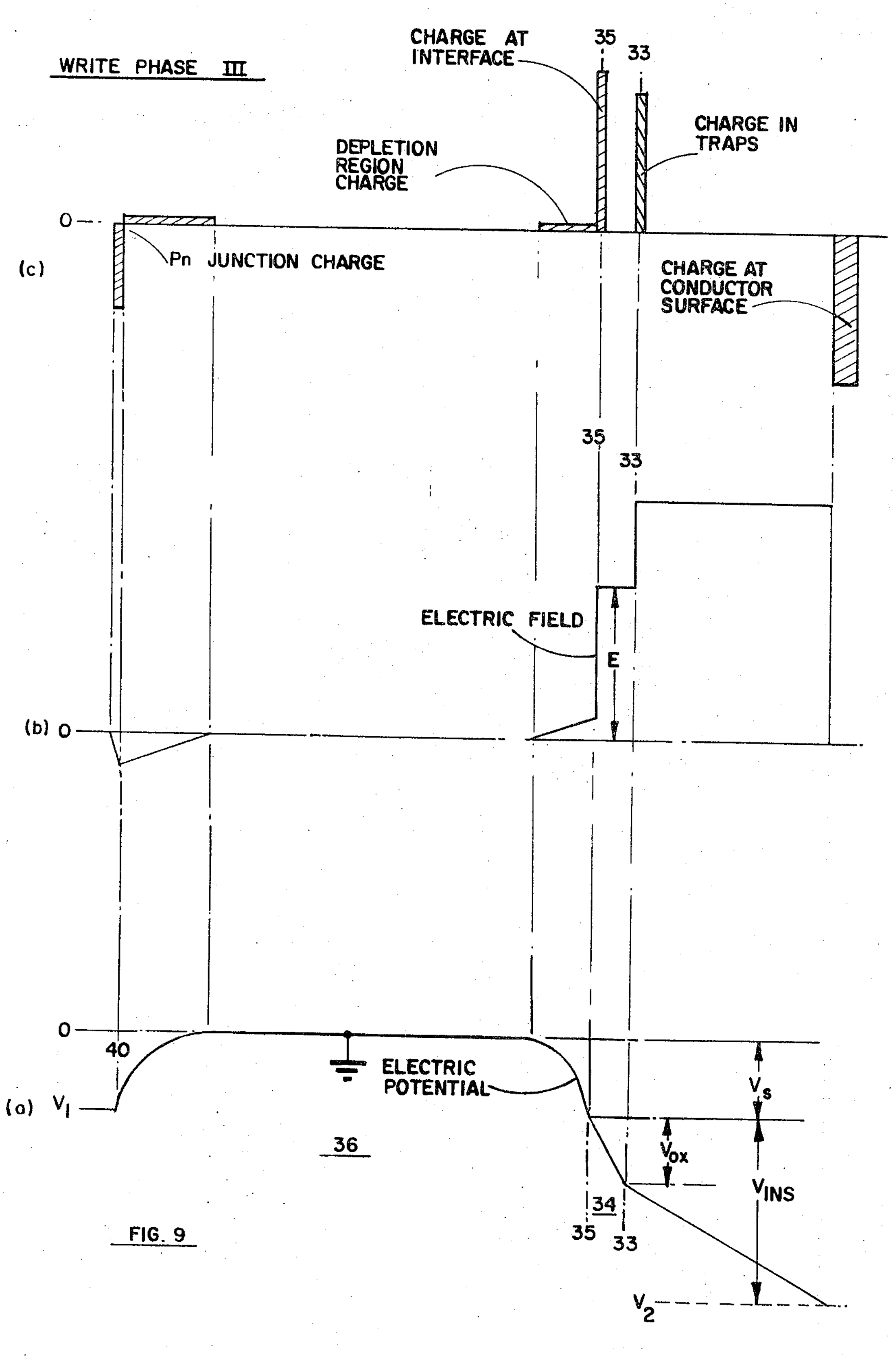
FIG. 9 illustrates the field, potential and charge distribution after the tunneling current has stopped, but before the write voltage has been removed.

To write a 1 into a selected memory cell, a light source for which $h\nu > E_{gap}$ is focused on the memory site. The light beam passes essentially unaltered through the transparent conductor (i.e., transparent to this wavelength) and both insulating layers. Most of the light, however, is absorbed within a short distance after it enters region 36. Each absorbed photon generates a hole-electron pair. Because of the inversion region and the resulting electric field, the holes are drawn to the semiconductor-insulator interface, where they collect as shown in FIG. 8*c*. The collection of positive charges at the interface increase the field across the second insulator ($SiO_2$) whose thickness (~20 A) has been selected so that the increased field resulting from the collection of charges is sufficient to induce a significant tunneling current therethrough between interfaces 33 and 35. The tunneling — actually the flow of electrons from interface 33 into the conduction band of region 36 — results in the deposit of a net positive charge at the interface 33, as shown in FIG. 9*c*. Once enough positive charge has collected at interface 33 to reduce the electric field across the oxide to less than the critical value for tunneling, the current flow stops. The deposited positive charge constitutes a stored binary 1. If the inversion stop grid were not provided, the holes which entered the inversion region would diffuse sidewise before the critical tunneling field was reached, thus preventing writing of data into the memory.

At those memory sites where no light beam is present to generate hole-electron pairs, the field across the $SiO_2$ does not reach the critical value for tunneling and no charge is stored at interface 33, which lack of charge corresponds to a binary 0.

Once the desired information has been written into the memory, the write voltage is removed and the inversion regions disappear.

B. Reading Information Stored in the CIJ Memory

Figure 10:
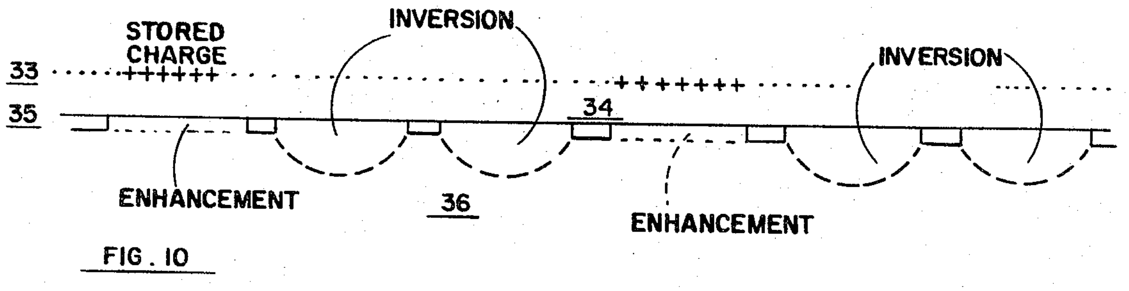
FIG. 10 illustrates the enhancement and inversion regions which result from the application of the reading voltage and provide a differentiation between those memory cells storing charge and those not storing charge.
Figure 11:
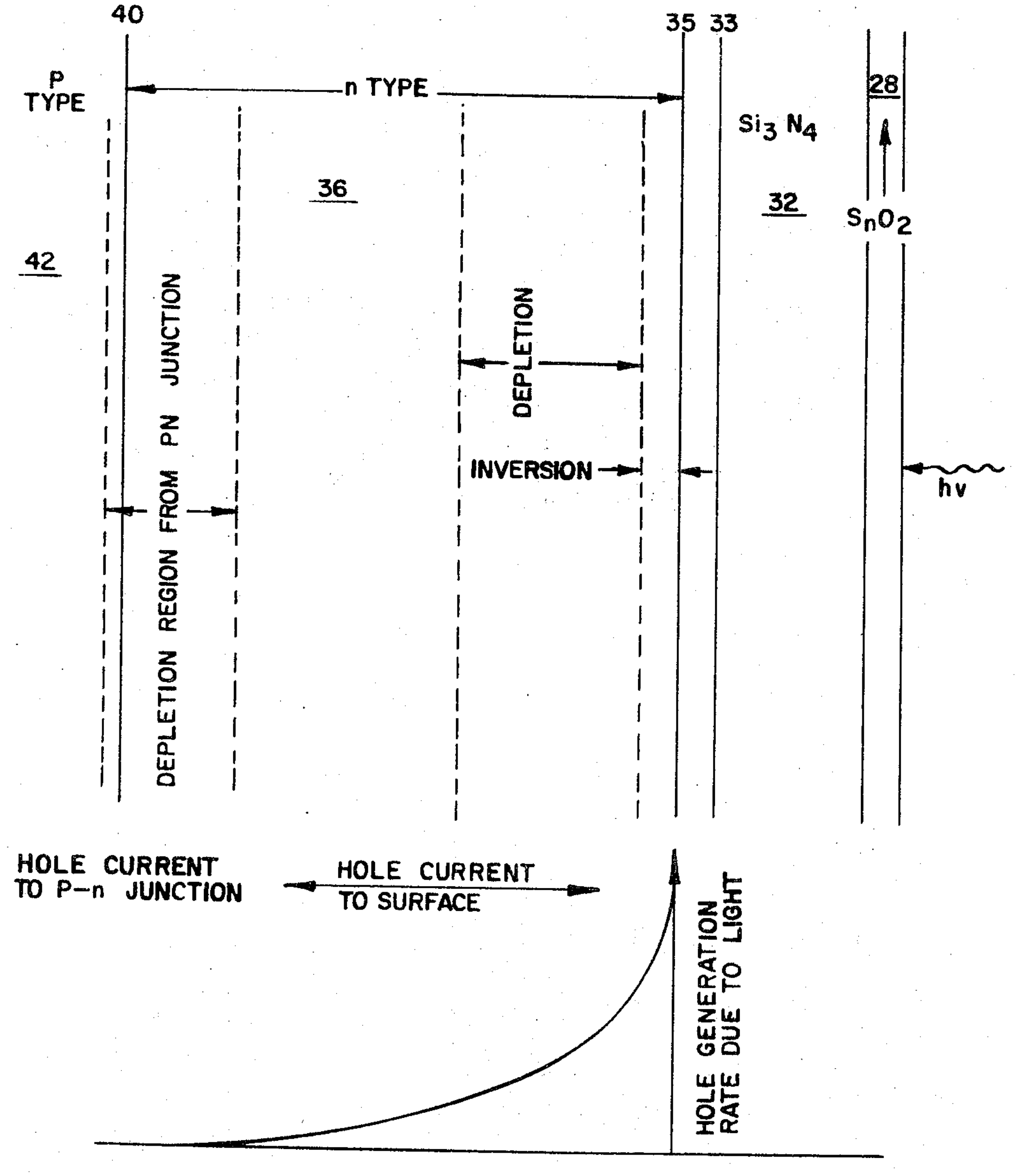
FIG. 11 illustrates the flow of holes during the reading of a zero - i.e., where no charge was stored.
Figure 12:
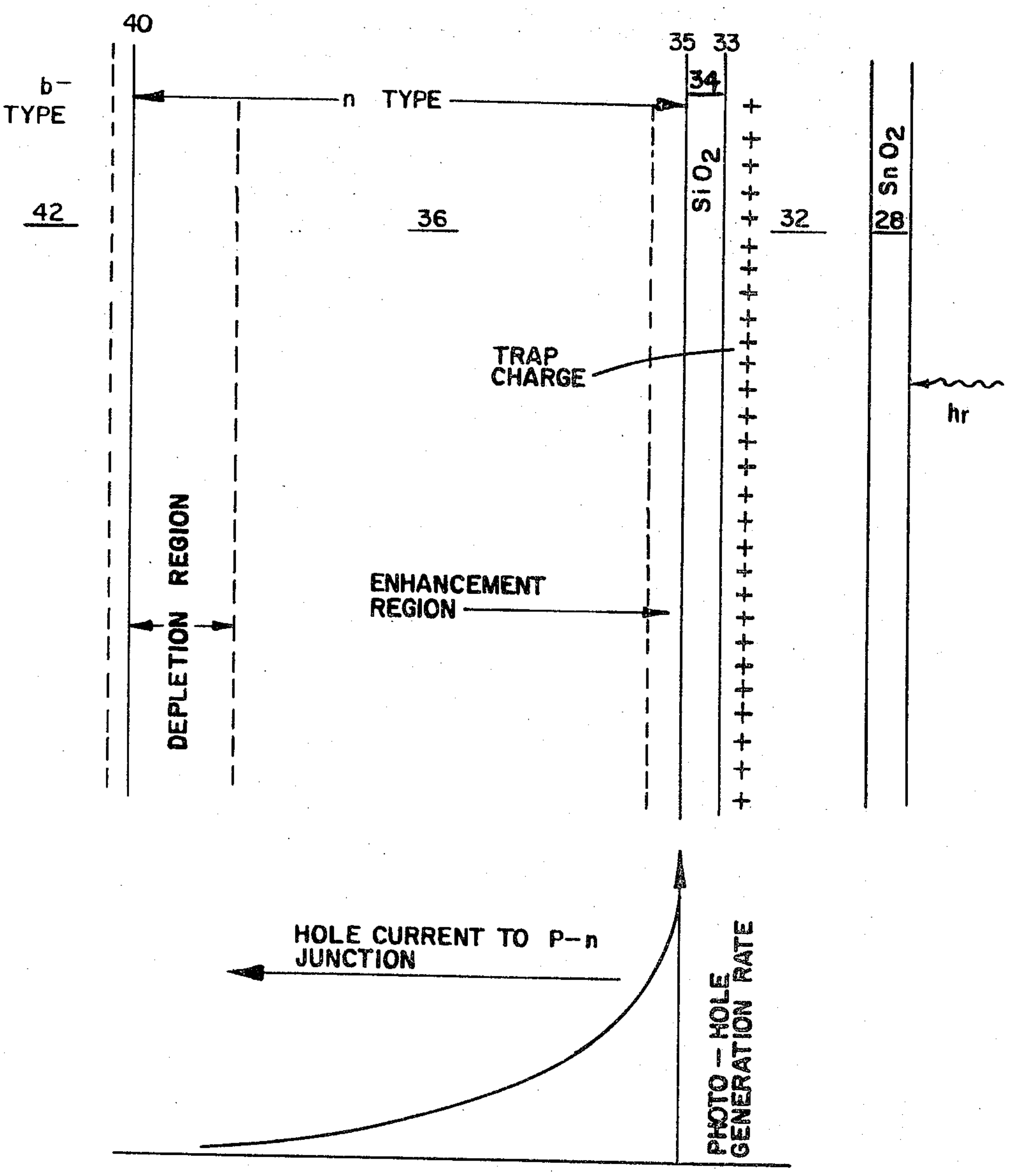
FIG. 12 illustrates the flow of holes during the reading of a one - i.e., where there is charge stored.

To read data out of the CNOJ memory, pn-junction 40 is retained back biased and transparent conductor 28 is held two or three volts more negative than region 36. This produces a differentiation between those storage sites which contain stored charge and those which do not. An inversion region forms at those storage sites which contain no stored charge, while there is no inversion region, but instead a slight enhancement region at those sites which contain a significant stored charge, as shown in FIG. 10. If a sensing (reading) light beam is now scanned across the memory, it will generate hole-electron pairs in region 36. The direction of hole flow will depend on whether an inversion region or an enhancement region exists at the storage site where the holes are generated. The enhancement is not necessary for the differentiation, however, it increases the degree of differentiation.

Where there is no charge stored (a stored "zero") the generated holes are drawn into the inversion region and collect at the semiconductor-insulator interface as happens during writing (there is not sufficient voltage across the $SiO_2$ layer to cause tunneling during reading). The collection of charge at the semiconductor-insulator interface means that little or no current flows across pn-junction 40 and thus little or no current flows through the leads to output node 54 to load resistor 52 and output lead 56. The collector of the holes in the inversion region is a result of the fact that most of the holes are generated within the depletion region as illustrated in FIG. 11.

Where there are charges stored at interface 33 the lack of inversion and depletion regions and the existence of an enhancement region results in an electric field which draws the holes to the junction 40, where they are drawn into the p-region 42 and contribute to the output current to node 54 as illustrated in FIG. 12.

The difference between the output current resulting from reading a zero and that resulting from reading a one is used to determine whether a zero or a one was read. A threshold detector set to a level midway between the values for a one and a zero can be used to distinguish ones and zeroes, or a system with a dead space in the middle of the range separating the zero and one may be used, with an error indication being given when the current is with this "no value" zone.

C. Erasure of Data from Memory

To erase a block of data from the memory, an erase voltage of opposite polarity to the write voltage is applied to transparent conductor 28. This voltage causes electrons to collect at the semiconductor insulator interface 35. These collected electrons in combination with the applied voltage generate a tunneling field at those interface storage sites at which charges are stored. As a result, electrons tunnel to the storage interface 33 and neutralize the charge stored there. If it is desired to preserve part of the data within a block which is to be erased, the data to be preserved must be read out and temporarily stored until after the data block has been erased. After the block has been erased, the preserved data may then be rewritten into the memory block.

D. Operation of the Overall Optical Memory System

The operation of the overall memory system depends in part on how the light beam addressing and light beam generating means are implemented. For the addressing system shown in FIGS. 4 and 5, the disc 92 is rotated to bring the column containing the selected memory cell into alignment with an input-output position where a light source means 96 can illuminate the memory cell. Either subsequently or simultaneously the light source means 96 is adjusted radially to bring one of the LEDs 98 into alignment with the selected memory cell. The write voltage is applied to the memory device containing the selected site and pulse generator means 72 applies a driving current pulse to the aligned LED if a "one" is to be written. If a "zero" is to be written pulse generator 72 emits no pulse. Thus, the light beam is intensity modulated by the data to be stored. If data is to be written into multiple cells in the selected column, each LED which is aligned with a selected cell may be pulsed simultaneously with the first aligned LED. This reduces the cumulative time necessary for writing the desired data into the memory.

The next data bit may be aligned by moving the light source or by rotating the disc. Where the same row is to be written into a number of consecutive columns, the writing may take place while the disc is rotating.

In the event that energy or other considerations make the use of a laser light source desirable, an acoustic-optic or moving mirror scanning system may be used for addressing. In that event the addressing system is adjusted and then the laser is pulsed if a pulsed laser is used, or a shutter is opened if a *cw* laser is being used.

Whatever type of light source and addressing is used, it is preferred that the output means 80, which may be a gated amplifier is shut off during writing and erasing to prevent meaningless signals from being supplied at the system output.

If so desired the CIJ optical memory device may be used for analog storage as well as for digital storage.

While this invention has been described in terms of its preferred embodiment and variations thereon, it will be understood that many other variations will occur to those skilled in the art.

What is claimed is:

1. A long-term-storage CIJ optical memory device comprising:

transparent conductor means forming a front surface of the device;

insulation means contiguous to the back of the transparent conductor means for storing charges, said insulation means containing a storage interface capable of trapping charges thereat, said insulation means being susceptible to tunneling between storage interface and a back surface of the insulation means;

semiconductor means having a front surface and rectifying junction;

said semiconductor means having an inversion stop grid means associated with the front surface thereof; and contact means for connecting external voltages to first and second sides of the rectfying junction for biasing the junction.

2. The apparatus of claim 1 wherein the insulation means comprises front and back insulating layers and wherein the storage interface is an interface between the front and back insulating layers.

3. The apparatus of claim 2 wherein:

the front insulating layer is a relatively thick layer of silicon nitride; and the back insulating layer is a relatively thin layer of silicon oxide.

4. The apparatus of claim 3 wherein the silicon nitride is on the order of 500 A thick and the silicon oxide is about 20 A thick.

5. The apparatus of claim 1 wherein:

the semiconductor means comprises a front semiconductor region of a first conductivity type; and the inversion-stop grid means defines a plurality of memory cells.

6. The apparatus of claim 5 wherein the inversion stop grid means comprises semiconductor material having the same conductivity type as the front semiconductor region, but being more heavily doped than said front region.

7. The apparatus of claim 5 wherein the semiconductor means further comprises a second semiconductor region of a second conductivity type; and wherein an interface between the front and second semiconductor regions constitutes the rectifying junction.

8. The apparatus of claim 7 wherein the contact means comprises:

an ohmic contact to the front semiconductor region; and back conductor means forming an ohmic contact with the second semiconductor region.

9. The apparatus of claim 7 further comprising a third semiconductor region contiguous to the back of the second semiconductor region, said third region being of the second conductivity type but more heavily doped than the second region.

10. The apparatus of claim 9 wherein:

an ohmic contact to the front semiconductor region comprises a contact to the first side of the rectifying junction; and the third semiconductor region constitutes a contact to the second side of the rectifying junction.

11. The apparatus of claim 10 wherein the front semiconductor region is n-type silicon and the second and third semiconductor regions are p-type silicon.

12. The apparatus of claim 5 wherein the inversion stop semiconductor grid is inlaid into the front semiconductor region.

13. An optical memory system comprising:

a CIJ optical memory device as in claim 12;

first d.c. voltage supply means connected across the contact means for maintaining the rectifying junction back biased;

second variable d.c. voltage supply means connected between the transparent conductor and the front semiconductor region for establishing bias electric fields across the insulating means;

light beam addressing means for delivering a light beam to a selected memory cell;

light beam supply means for producing a light beam whose intensity is modulated by the information to be stored; and memory control means for coordinating the operation of the first and second voltage supply means and the light beam addressing means and light beam supply means to provide long term data storage in the CIJ memory device.

14. A long-term-storage CIJ memory device having a layered structure and comprising:

transparent conductor means forming a front surface of the device;

front insulating layer means adjacent the transparent conductor;

a back insulating layer means adjacent the front insulating layer, for permitting a significant tunneling current to flow therethrough when an electric field across the insulating layer means is enhanced by the concentration of charges in the vicinity of the back surface of the back layer, but for preventing the flow of significant tunneling current when the field is applied without the presence of a concentration of charges in the vicinity of the back surface of the layer;

a front semiconductor region of a first conductivity type adjacent to the back surface of the second insulating layer, and having an ohmic contact thereto;

inversion stop grid means associated with the front surface of the front semiconductor region for preventing the formation of inversion regions at the front surface of the front semiconductor region which extend across lines of the grid means;

a back semiconductor region of a second conductivity type adjacent the back edge of the front region for forming a rectifying junction with the first region; and back conductor means forming an ohmic contact to the back semiconductor region for collecting any current flowing across the rectifying junction.

15. A CIJ optical memory system comprising:

memory device support disc means for supporting a plurality of CIJ optical memory devices on at least one side thereof, each of said CIJ optical memory devices comprising:

transparent conductor means forming a front surface of the device;

insulation means contiguous to the back of the transparent conductor means for storing charges, said insulation means containing a storage interface capable of trapping charges thereat, said insulation means being susceptible to tunneling between the storage interface and a back surface of the insulation means;

semiconductor means having a front surface and a rectifying junction;

said semiconductor means having an inversion stop grid means associated with the front surface thereof;

contact means for connecting external voltages to first and second sides of the rectifying junction for biasing the junction;

disc suspension means for rotatably supporting the disc means to allow the disc means to be rotated to align a selected memory cell with an input-output position;

disc drive means for rotating the disc to a selected position;

light source means at the input-output position for providing a memory activating light beam; and said light source means being radially movable for aligning the light beam with a selected memory cell.

16. A method of writing information into a selected cell of a CIJ optical memory device which device comprises transparent conductor means forming a front surface of the device, insulation means contiguous to the back of the transparent conductor means for storing charges, said insulation means containing a storage interface capable of trapping charges thereat, said insulation means being susceptible to tunneling between the storage interface and a back surface of the insulation means, semiconductor means having a front surface and a rectifying junction, said semiconductor means having an inversion stop grid means associated with the front surface thereof, contact means for connecting external voltages to first and second sides of the rectifying junction for biasing the junction; said method comprising the steps of:

applying a write voltage across the CIJ insulation means to induce a depletion region in the semiconductor means adjacent the semiconductor-means/insulation-means interface, at least a portion of the depletion region being capable of being inverted; and illuminating the selected cell with a light beam which is intensely modulated by the information to be stored in the selected cell, in order to photogenerate hole-electron pairs to invert the invertable portion of the depletion region in accordance with the light intensity, the charge in said invertable region in combination with the write voltage inducing tunneling between the semiconductor-means/insulation-means interface and the storage interface in accordance with the light intensity to trap charge at the storage interface in accordance with the information to be stored.

17. A method of reading information out of a selected memory cell of a CIJ optical memory device, which device comprises transparent conductor means forming a front surface of the device, insulation means contiguous to the back of the transparent conductor means for storing charges, said insulation means containing a storage interface capable of trapping charges thereat, said insulation means being susceptible to tunneling between the storage interface and a back surface of the insulation means, semiconductor means having a front surface and a rectifying junction, said semiconductor means having an inversion stop grid means associated with the front surface thereof, contact means for connecting external voltages to first and second sides of the rectifying junction for biasing the junction, said method comprising the steps of:

backbiasing the CIJ rectifying junction;

applying a read voltage across the CIJ insulating means to induce a depletion region in the semiconductor means at each storage cell which is uncharged;

illuminating with a reading light beam the selected memory cell, the extent of which is limited by the inversion stop grid means; and monitoring the current collected by the reverse biased rectifying junction to determine the extent of any depletion region in the semiconductor means at the semiconductor-means/insulation-means interface, thereby determining the charge and thus the information stored in the cell being read.

18. A method of sensing information stored in a CIJ memory device, which device comprises transparent conductor means forming a front surface of the device, insulation means contiguous to the back of the transparent conductor means for storing charges, said insulation means containing a storage interface capable of trapping charges thereat, said insulation means being susceptible to tunneling between the storage interface and a back surface of the insulation means, semiconductor means having a front surface and a rectifying junction, said semiconductor means having an inversion stop grid means associated with the front surface thereof, contact means for connecting external voltages to first and second sides of the rectifying junction for biasing the junction, wherein the information is stored in the form of charges in the insulating layer overlying the semiconductor material, said method comprising the steps of:

injecting minority carriers in the semiconductor material; and sensing the direction of flow of the carriers perpendicular to the interface between the insulating layer and the semiconductor material to determine the extent of any depletion region in the vicinity to the semiconductor-means/insulation-means interface to determine the charge trapped at the storage interface.

19. A method of writing information into a CIJ memory comprising transparent conductor means forming a front surface of the device, insulation means contiguous to the back of the transparent conductor means for storing charges, said insulation means containing a storage interface capable of trapping charges thereat, said insulation means being susceptible to tunneling between the storage interface and a back surface of the insulation means, semiconductor means having a front surface and a rectifying junction, said semiconductor means having an inversion stop grid means associated with the front surface thereof, contact means for connecting external voltages to first and second sides of the rectifying junction for biasing the junction;

said method comprising the steps:

inducing an invertible depletion region in the semiconductor means adjacent to the insulation means;

photogenerating whole-electron pairs behind the cells where the information is to be written;

collecting carriers at the insulating means-semiconductor means interface until an electric field of sufficient strength to induce tunneling in the insulator means develops, whereby charges are trapped at the CIJ storage interface in the cell where information is to be written.

20. The method recited in claim 19 wherein the depth of said invertible region is such that the inversion stop grid means divides the invertible region into individual invertible regions which are limited by the inversion stop grid means.

21. A method of reading information out of a selected CIJ memory cell of a CIJ memory comprising transparent conductor means forming a front surface of the device, insulation means contiguous to the back of the transparent conductor means for storing charges, said insulation means containing a storage interface capable of trapping charges thereat, said insulation means being susceptible to tunneling between the storage interface and a back surface of the insulation means, semiconductor means having a front surface and a rectifying junction, said semiconductor means having an inversion stop grid means associated with the front surface thereof, contact means for connecting external voltages to first and second sides of the rectifying junction for biasing the junction, said method comprising the steps:

backbiasing the rectifying junction;

inducing a depletion region in the semiconductor means behind the memory cells not storing charge;

injecting minority carriers into the semiconductor region behind the memory cell to be read;

collecting the current flowing across the backbias rectifying junction; and determining from the magnitude of the collected current whether there was charge stored at the selected memory cell.

* * * * *